United States Patent
Quast et al.

(10) Patent No.: US 11,180,053 B2
(45) Date of Patent: Nov. 23, 2021

(54) LONGITUDINAL ADJUSTER AND VEHICLE SEAT

(71) Applicant: ADIENT ENGINEERING AND IP GMBH, Burscheid (DE)

(72) Inventors: Ingo Quast, Duesseldorf (DE); Erik Sprenger, Wermelskirchen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 17/252,767

(22) PCT Filed: Jun. 25, 2019

(86) PCT No.: PCT/EP2019/066737
§ 371 (c)(1),
(2) Date: Dec. 16, 2020

(87) PCT Pub. No.: WO2020/002274
PCT Pub. Date: Jan. 2, 2020

(65) Prior Publication Data
US 2021/0252999 A1   Aug. 19, 2021

(30) Foreign Application Priority Data

Jun. 29, 2018 (DE) .......................... 102018115809.2
Sep. 11, 2018 (DE) .......................... 102018122094.4

(51) Int. Cl.
*B60N 2/00* (2006.01)
*B60N 2/07* (2006.01)

(52) U.S. Cl.
CPC ......... *B60N 2/0727* (2013.01); *B60N 2/0725* (2013.01)

(58) Field of Classification Search
None
See application file for complete search history.

(56) References Cited

U.S. PATENT DOCUMENTS 10,343,556 B2 * 7/2019 Laumeier .............. F16C 33/583
2011/0240821 A1 * 10/2011 Couasnon ............ B60N 2/0727
248/429

(Continued)

FOREIGN PATENT DOCUMENTS

DE          41 05 231 A1   9/1992
DE   10 2005 047 452 A1   4/2007

(Continued)

OTHER PUBLICATIONS

PCT International Search Report and Written Opinion (PCT/EP2019/066737).

*Primary Examiner* — Steven M Marsh
(74) *Attorney, Agent, or Firm* — Marshall & Melhorn, LLC

(57) ABSTRACT

A longitudinal adjuster for a vehicle seat may have at least one seat rail pair, which is formed from a lower seat rail and an upper seat rail, which is guided for sliding in the longitudinal direction relative to the lower seat rail. The two seat rails of the seat rail pair may engage around one another. The lower seat rail or the upper seat rail may have at least one opening. The at least one opening may have an opening cross-section, the two upper corner regions of which each have a curvature portion may have a radius which continuously changes of the course of the curvature portion. A vehicle seat with the adjuster is described.

14 Claims, 3 Drawing Sheets

(56) References Cited

U.S. PATENT DOCUMENTS

| | | | | |
|---|---|---|---|---|
| 2012/0001049 A1* | 1/2012 | Selbold | ............... | B60N 2/0818 248/429 |
| 2012/0318948 A1* | 12/2012 | Yamada | ............... | B60N 2/0875 248/429 |
| 2013/0206952 A1* | 8/2013 | Yamada | ............... | B60N 2/0722 248/429 |
| 2014/0042289 A1* | 2/2014 | Kawano | ............... | B60N 2/0875 248/429 |
| 2014/0110553 A1* | 4/2014 | Hoshihara | ................ | B60N 2/06 248/429 |
| 2014/0138510 A1* | 5/2014 | Yamada | ............... | B60N 2/0875 248/429 |

FOREIGN PATENT DOCUMENTS

| | | |
|---|---|---|
| DE | 10 2011 051 490 A1 | 1/2012 |
| DE | 10 2013 008 871 A1 | 8/2014 |
| JP | 2005-67218 | 3/2005 |

\* cited by examiner

LONGITUDINAL ADJUSTER AND VEHICLE SEAT

The invention relates to a longitudinal adjuster, in particular for a vehicle seat, having at least one pair of seat rails, which is formed from a lower seat rail and an upper seat rail, which is guided displaceably in the longitudinal direction relative to the lower seat rail, wherein the two seat rails of the pair of seat rails engage mutually around one another, and to a vehicle seat.

BACKGROUND

JP 2005-67218 A discloses a vehicle seat of the type in question having a longitudinal displacement mechanism with end stops for limiting the displacement travel. The longitudinal displacement mechanism has end stops between an upper rail and a lower rail, wherein limiting elements of the lower rail and limiting elements of the upper rail are arranged on the same partial regions projected in the longitudinal direction.

DE 41 05 231 A1 discloses a longitudinal adjustment of a motor vehicle seat which is provided with at least one first rail fixed to the seat frame and a second rail fixed to the vehicle. One of the rails has an attachable stop cap at both ends for limiting the relative displacement movement of the two rails with respect to one another.

DE 10 2013 008 871 A1 discloses a locking device for the longitudinal adjustment of a vehicle seat, with which a first rail can be arrested relative to a second rail and which has an arresting means which is connected to one of the rails and which reversibly engages in a recess in the other rail for arresting purposes.

DE 10 2005 047 452 A1 discloses an adjustment device for a vehicle seat, which adjustment device has a sheet metal structure with at least one recess which can be brought into form-fitting engagement with a bolt element. According to the invention, it is provided that the recess is provided with an at least partially encircling bead.

A further exemplary sliding rail for a vehicle seat is known from DE 10 2011 051 490 A1.

Problem

The invention is based on the problem of improving a longitudinal adjuster of the type mentioned at the beginning, in particular of permitting an optimized formation and configuration of fastenings for end caps, and of providing a corresponding vehicle seat.

SUMMARY

This problem is solved according to the invention by a longitudinal adjuster, in particular for a vehicle seat, having at least one pair of seat rails, which is formed from a lower seat rail and an upper seat rail, which is guided displaceably in the longitudinal direction relative to the lower seat rail, wherein the two seat rails of the pair of seat rails engage mutually around one another, wherein the lower seat rail or the upper seal rail has at least one opening, wherein the at least one opening has a substantially rectangular opening cross section, the two upper corner regions of which each have a curvature portion having a radius which continuously changes over its course.

Owing to the fact that the at least one opening has a substantially rectangular opening cross section, the two upper corner regions of which each have a curvature portion having a radius which continuously changes over its course, a contour of an opening provided for fastening end caps is provided, said contour reducing a stress, which occurs in the region of the opening, in the material of the seat rail.

Each of the curvature portions of the two upper corner regions at least approximately forms a contour which is minimized in terms of notch stress. An upper edge portion arranged between the two adjacent upper curvature portions has a rectilinear profile. The upper edge portion preferably runs horizontally.

The lower seat rail and/or the upper seat rail can have two openings arranged mirror-symmetrically with respect to a plane perpendicular to the transverse direction.

The at least one opening can be arranged in the region of at least one of the two ends in the longitudinal direction of the lower seat rail and/or of the upper seat rail. The lower seat rail and/or the upper seat rail can in each case have at least one opening in the region of their two ends in the longitudinal direction.

The at least one opening can have an opening cross section, the two lower corner regions of which each have a first radius. A second radius, namely the radius of the curvature portions, of the at least one opening can be larger than a first radius of the lower corner regions of the at least one opening.

An upper edge portion arranged between the two adjacent upper curvature portions can be configured to be comparatively narrower than an opposite lower edge portion of the at least one opening.

The at least opening can be configured such that a hook of a covering cap for the respective end of the lower seat rail or upper seat rail engages in the at least one opening in order to secure the covering cap on the respective lower seat rail or upper seat rail.

The problem is furthermore solved by a vehicle seat having a longitudinal adjuster according to the above description. The vehicle seat according to the invention consequently has the same advantages as the previously described refinements of the longitudinal adjuster.

BRIEF DESCRIPTION OF THE FIGURES

The invention is explained in more detail below with reference to an advantageous exemplary embodiment illustrated in the figures. However, the invention is not restricted to said exemplary embodiment. In the figures.

DETAILED DESCRIPTION

A vehicle seat 100 which is illustrated schematically in FIG. 1 will be described below using three spatial directions running perpendicularly to one another. With a vehicle seat 100 installed in the vehicle, a longitudinal direction x runs substantially horizontally and preferably parallel to a vehicle longitudinal direction which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. With a vehicle seat 100 installed in the vehicle, the vertical direction z runs parallel to the vehicle vertical axis.

The position specifications and direction specifications used, such as for example front, rear, top and bottom, relate to a viewing direction of an occupant seated in a seat part 102 of the vehicle seat 100 in a normal seat position, wherein the vehicle seat 100 is installed in the vehicle and is oriented in a use position suitable for passenger transport, with an upright backrest 104 and in the direction of travel as customary. However, the vehicle seat 100 according to the invention may also be installed in a different orientation, for example transversely with respect to the direction of travel.

Figure 1:
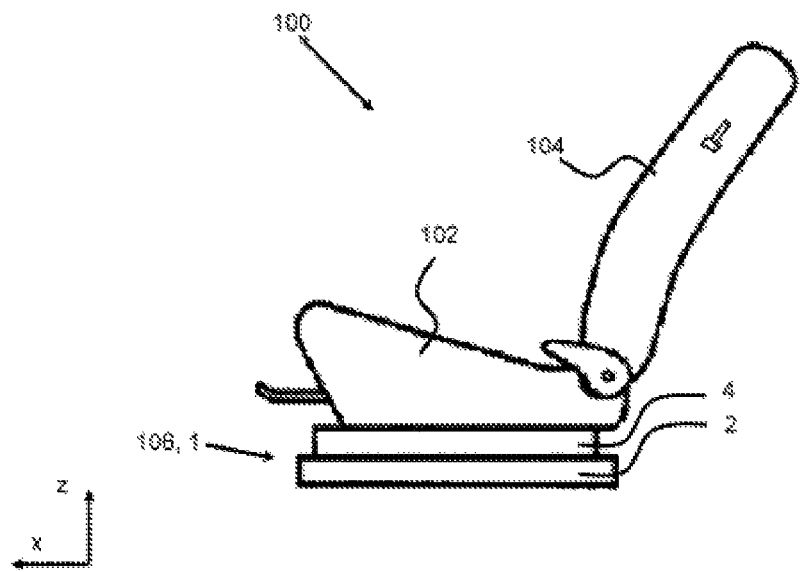
FIG. 1: shows a schematic illustration of a vehicle seat having a longitudinal adjuster according to the invention.

The vehicle seat 100 shown in FIG. 1 for a motor vehicle has the seat part 102 and a backrest 104 which is adjustable in its inclination relative to the seat part 102. An inclination of the backrest 104 can be adjustable, for example, by means of a latching fitting or a geared fitting. The vehicle seat 100 is mounted on a longitudinal adjuster 106 for adjusting a longitudinal position of the seat.

Figure 2:
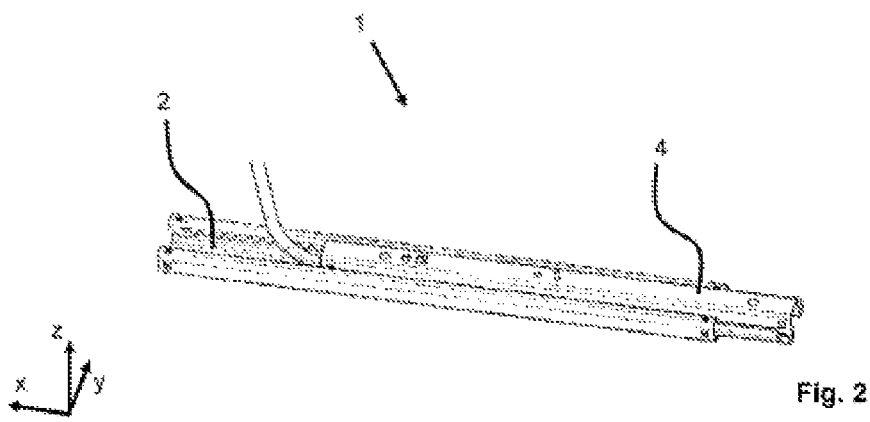
FIG. 2: shows a schematic illustration of a pair of seat rails of a longitudinal adjuster known from the prior art.
Figure 3:
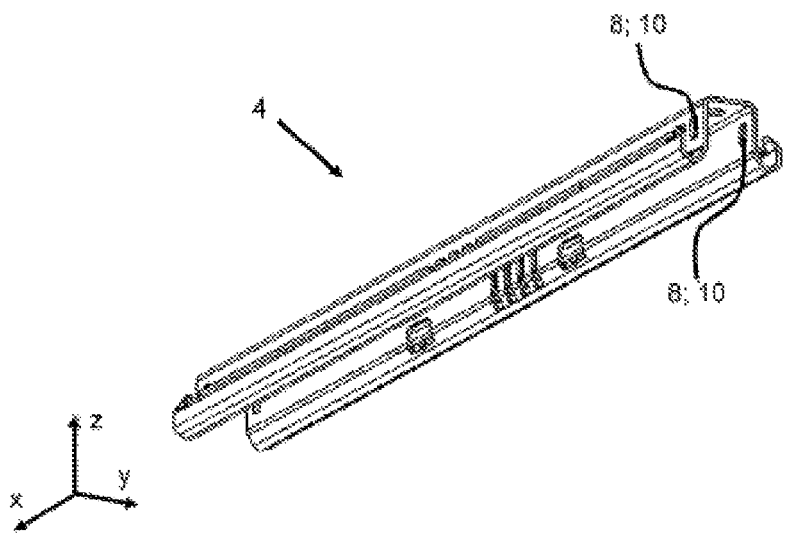
FIG. 3: shows a perspective illustration of an upper seat rail of the pair of seat rails from FIG. 2, FIG. 4: shows a perspective illustration of the upper seat rail from FIG. 3, in the region of an opening.
Figure 4:
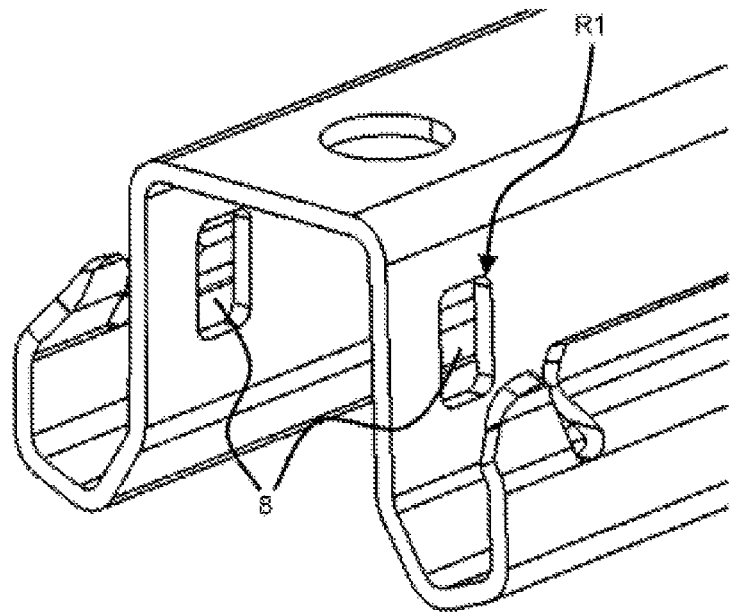

FIGS. 2 to 4 show a pair of seat rails 1 known from the prior art. The pair of seat rails 1 is formed from an upper seat rail 4, which may also be referred to as the upper rail, and from a lower seat rail 2, which may also be referred to as the lower rail. A locking device can be arranged in a cavity formed between the lower seat rail 2 and the upper seat rail 4. The locking device is actuable by means of an actuating lever. A design and a function of devices for actuating the locking device, in particular for moving a locking plate of the locking device into an unlocking position or into a locking position, are fundamentally known. In this respect, reference should be made by way of example to DE 10 2010 049 542 A1 and to DE 10 2014 219 868 A1, the disclosure of which in this regard is expressly incorporated herein.

Figure 5:
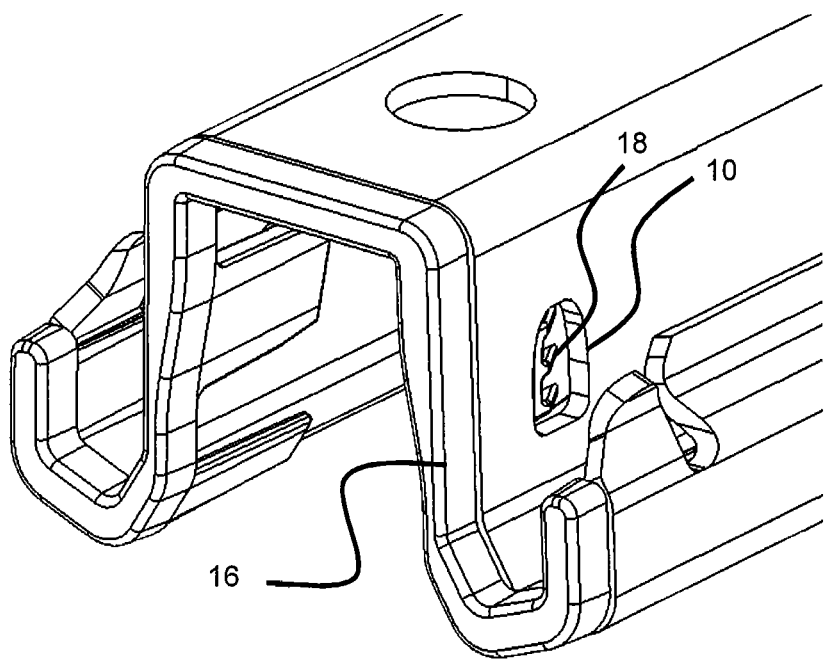
FIG. 5: shows a perspective illustration of the upper seat rail of the longitudinal adjuster according to the invention, in the region of an opening with a fitted covering cap.

FIG. 3 shows the upper seat rail 4 of the pair of seat rails 1. The upper seat rail 4 has a respective opening in the region of its two ends in the longitudinal direction x in the flanks running substantially vertically. As shown in FIG. 5, the openings 8, 10 are configured such that a hook 18 of a covering cap 16 for the ends of the upper seat rail 4 engages in in each case one opening 8, 10 in order to secure the covering cap 16 on the upper seat rail 4. The covering cap 16 covers the end side of an end region of the lower seat rail 2 or of the upper seat rail 4. The covering cap 16 has an aesthetic function and also provides protection against injury.

FIG. 4 shows an opening 8, which is known from the prior art, in the upper seat rail 4. The openings 8 are preferably arranged in the region of at least one of the two ends of the upper seat rail 4. The opening 8 has a substantially rectangular opening cross section which has rounded corner regions 14b. The rounded corner regions 14b of the opening 8 all have a curvature with a first radius R1.

Figure 6:
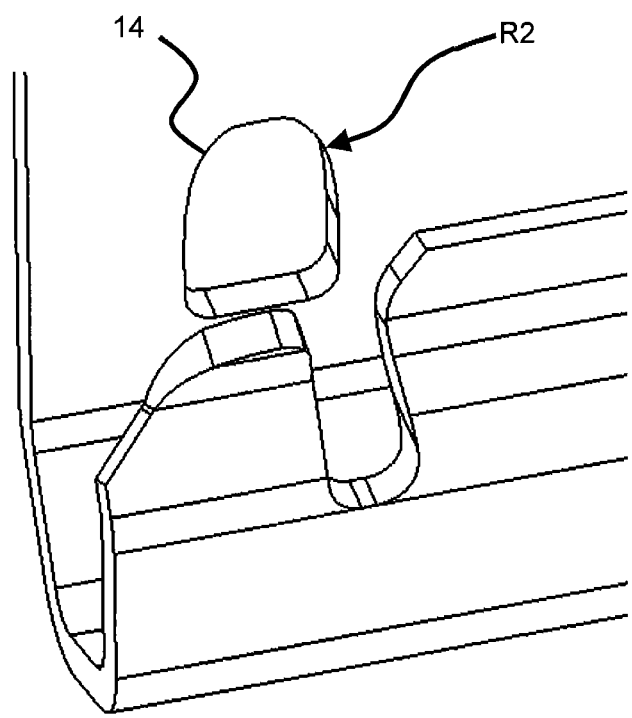
FIG. 6: shows an enlarged illustration of FIG. 5.

FIG. 5 shows an opening 10 in an upper seat rail 4 of a longitudinal adjuster 106 according to the invention. The openings 10 are configured such that a hook 18 of a covering cap 16 for the ends of the upper seat rail 4 engages in in each case one opening 10 in order to secure the covering caps 16 on the upper seat rail 4. The opening 10 is illustrated in enlarged form in FIG. 6. The upper seat rail 4 which is shown by way of example here always has two openings 10 which are arranged in pairs symmetrically with respect to one another in the transverse direction y. The openings 10 which are arranged in pairs are furthermore preferably arranged in the region of the two ends of the upper seat rail 4, as viewed in the longitudinal direction x. This can likewise apply to a further arrangement of openings 10 in a lower seat rail 2.

The openings 10 each have an opening cross section, the two upper corner regions of which each run in a curvature portion 14a having a second radius R2 which changes continuously over its course. Consequently, the curvature portions 14a do not run along a circular portion, but rather along a curve differing from a circular portion. The curvature portions 14a can have a profile of a parabola. The opening cross section of the openings 10 has a first radius R1 in each case in the two lower corner regions 14b. An upper edge portion 12a in the vertical direction z which is arranged between the two adjacent upper curvature portions 14a is narrower than an opposite, lower edge portion 12b in the vertical direction z of the at least one opening 10. The upper edge portion 12a of the openings 10 between the two adjacent upper curvature portions 14a is narrower, or shorter, than an upper edge portion of the openings 8. The second radius R2 which changes continuously over its course is larger in all of the regions of the curvature portions 14a of the openings 10 than the first radius R1 of the lower corner regions 14b of the openings 10.

The features which are disclosed in the above description, the claims and the drawings may be of significance both individually and in combination for implementing the invention in its various refinements.

Although the invention has been described in detail in the drawings and the preceding description, the descriptions should be understood as being illustrative and exemplary and not restrictive. In particular, the choice of the graphically illustrated proportions of the individual elements should not be interpreted as required or restrictive. Furthermore, the invention is in particular not restricted to the exemplary embodiments explained. Further variants of the invention and the implementation thereof are apparent to a person skilled in the art from the preceding disclosure, the figures and the claims.

Terms such as "comprise", "have", "include", "contain" and the like which are used in the claims do not rule out further elements or steps. The use of the indefinite article does not rule out a plural. A single device can carry out the functions of a plurality of units or devices mentioned in the claims.

LIST OF REFERENCE SIGNS

1 Pair of seat rails
2 Lower seat rail
4 Upper seat rail
8 Opening
10 Opening
12a Upper edge portion
12b Lower edge portion
14a Curvature portion
14b Corner region
16 Covering cap
18 Hook
100 Vehicle seat
102 Seat part
104 Backrest
106 Longitudinal adjuster
R1 Radius
R2 Radius x Longitudinal direction
y Transverse direction
z Vertical direction

The invention claimed is:

1. A longitudinal adjuster for a vehicle seat, comprising: at least one pair of seat rails, which is formed from a lower seat rail and an upper seat rail, which is guided displaceably in a longitudinal direction relative to the lower seat rail, wherein the two seat rails of the pair of seat rails engage mutually around one another, wherein the lower seat rail or the upper seal rail has at least one opening in a side wall, wherein the at least one opening has a substantially rectangular opening cross section, wherein two upper corner regions of which each have a curvature portion having a curvature portion radius which continuously changes over its course.

2. The longitudinal adjuster as claimed in claim 1, wherein each of the curvature portions of the two upper corner regions at least approximately forms a contour which is minimized in terms of notch stress.

3. The longitudinal adjuster as claimed in claim 1, wherein an upper edge portion arranged between two adjacent upper curvature portions has a rectilinear profile.

4. The longitudinal adjuster as claimed in claim 1, wherein the lower seat rail has two openings arranged mirror-symmetrically with respect to a plane perpendicular to a transverse direction.

5. The longitudinal adjuster as claimed in claim 1, wherein the upper seat rail has two openings arranged mirror-symmetrically with respect to a plane perpendicular to a transverse direction.

6. The longitudinal adjuster as claimed in claim 1, wherein the at least one opening is arranged in the region of at least one of two ends of the lower seat rail.

7. The longitudinal adjuster as claimed in claim 1, wherein the at least one opening is arranged in the region of at least one of two ends of the upper seat rail.

8. The longitudinal adjuster as claimed in claim 6, wherein the lower seat rail in each case has at least one opening in the region of its two ends.

9. The longitudinal adjuster as claimed in claim 6, wherein the upper seat rail in each case has at least one opening in the region of its two ends.

10. The longitudinal adjuster as claimed in claim 1, wherein the at least one opening has an opening cross section, the two lower corner regions of which each have a first radius.

11. The longitudinal adjuster as claimed in claim 10, wherein the curvature portion radius, which continuously changes over its course, in all of the regions of the curvature portions of the at least one opening is larger than the first radius of the lower corner regions of the at least one opening.

12. The longitudinal adjuster as claimed in claim 1, wherein an upper edge portion arranged between the two adjacent upper curvature portions is configured to be narrower than an opposite lower edge portion of the at least one opening, said lower edge portion being arranged between the two adjacent lower curvature portions.

13. The longitudinal adjuster as claimed in claim 6, wherein the at least one opening serves for receiving a hook of a covering cap for one of the two ends of the lower seat rail, wherein the hook engages in the at least one opening in order to secure the covering cap on the lower seat rail.

14. The longitudinal adjuster as claimed in claim 7, wherein the at least one opening serves for receiving a hook of a covering cap for one of the two ends of the upper seat rail, wherein the hook engages in the at least one opening in order to secure the covering cap on the upper seat rail.

* * * * *